United States Patent

Wright, III

[15] 3,639,096
[45] Feb. 1, 1972

[54] PROCESS OF TREATING DIRECT DYED CELLULOSIC TEXTILES WITH A MIXTURE OF AMINOPLAST CREASEPROOFING AGENTS AND PRODUCTS RESULTING THEREFROM

[72] Inventor: Ernest Linwood Wright, III, Danville, Va.
[73] Assignee: Dan River Inc., Danville, Va.
[22] Filed: Oct. 19, 1964
[21] Appl. No.: 404,900

Related U.S. Application Data

[63] Continuation-in-part of Ser. No. 290,338, June 25, 1963, abandoned.

[52] U.S. Cl. .................................. 8/74, 8/54.2, 8/116.3, 8/120, 117/139.4, 260/67.6
[51] Int. Cl. ................................ D06p 5/00, D06m 13/54
[58] Field of Search ................... 8/116.3, 120, 54.2, 74; 117/139.4

[56] References Cited

UNITED STATES PATENTS

| | | | |
|---|---|---|---|
| 2,690,404 | 9/1954 | Spangler et al. | 8/116.3 UX |
| 2,731,364 | 1/1956 | Reibnitz et al. | 8/116.3 UX |
| 2,804,402 | 8/1957 | Williams | 8/116.3 UX |
| 2,833,674 | 5/1958 | Hurwitz et al. | 8/116.3 UX |
| 2,898,238 | 8/1959 | Van Loo et al. | 8/116.3 UX |
| 3,049,446 | 8/1962 | Goldstein et al. | 8/116.3 UX |
| 3,052,570 | 9/1962 | Polansky et al. | 8/116.3 UX |
| 3,181,927 | 5/1965 | Roth et al. | 8/116.3 |
| 3,216,780 | 11/1965 | Landells et al. | 8/116.3 |

OTHER PUBLICATIONS

The Chemistry of Synthetic Dyes; K. Venkataraman, Vol. 1, 1952, pp. 296 and 297, Academic Press, Inc., New York, N.Y. TP913V4

*Primary Examiner*—George F. Lesmes
*Assistant Examiner*—H. Wolman
*Attorney*—Christen, Sabol & O'Brien

[57] ABSTRACT

Cellulosic textiles dyed with a direct dye characterized by a wrinkle-resistant finish which is resistant to degradative effects of retained chlorine, the finish comprising a cured composition which in the uncured state contained N,N'-dimethylol-4,5-dihydroxyethyleneurea and a methylated melamineformaldehyde condensate, said composition being cured with an acid catalyst and heat. Processes of manufacturing such textiles are also disclosed.

12 Claims, No Drawings

PROCESS OF TREATING DIRECT DYED CELLULOSIC TEXTILES WITH A MIXTURE OF AMINOPLAST CREASEPROOFING AGENTS AND PRODUCTS RESULTING THEREFROM

This application is a continuation-in-part of my previously filed application Ser. No. 290,338, filed June 25, 1963, now abandoned.

The present invention relates to novel water-soluble textile finishing compositions, to the process of applying the same to textile materials and to the textile materials so treated.

In particular, the present invention relates to compositions which, when applied to textile material, result in suprising and unexpected advantages over those achieved by the use alone of the individual components of the compositions. More specifically, the present invention relates to compositions comprising mixtures of N,N'-dimethylol-4,5-dihydroxyethyleneurea and polymethylol melamine resins or polymethylated polymethylol melamine resins.

Numerous textile resins have been employed in the finishing of cellulose containing textile materials to impart wrinkle resistance thereto. Among those employed with some measure of success were the methylated methylol urea resins, polymethylol melamine resins, the methylated methylol melamine resins, N,N'-dimethylol-4,5-dihydroxyethylene urea, and N,N'-dimethylol ethylene urea. Due to the inherent characteristic of the melamine resins to retain chlorine and to some extent, discolor therefrom, these resins have been blended heretofore with N,N'-dimethylol ethylene urea in order to minimize discoloration resulting from chlorine retention. This combination also minimized the adverse effect of chlorine retention characteristics of finishes made with N,N'-dimethylol ethylene urea alone in that this resin retains chlorine and fabrics carrying such finishes suffer severe losses in tensile strength when heated, as in ironing, subsequent to chlorine bleaching.

In addition, the tensile strength damage associated with chlorine retention during bleaching has been largely overcome by employing novel melamine resins alone or in combination with N,N'-dimethylol ethylene urea resin. In general, with certain of these improved resinous compositions, yellowing due to chlorine bleaching is at an acceptable minimum when bleaching occurs after strong acid treatment. Such finishes also are resistant to home laundering and to chlorine damage until they are degraded by acid conditions. For the most part, acid conditions do not occur in home laundering but do occur during the souring step in commercial laundering procedures. Although souring should be conducted at a pH of 5 and above, many laundries actually sour at pH's as low as 3.5. The use of very acid souring agents, such as hydrofluoric acid, an extra amount of a silicofluoride or an accidental rise in temperature of the souring medium are all sufficient to degrade resinous finishes customarily used in making wrinkle resistant fabrics.

Several of the textile resins which are employed in the treatment of dyed fabrics seriously impair their lightfastness. Fabrics treated with textile resins, such as N,N'-dimethylol-4,5-dihydroxyethyleneurea, when dyed with direct dyes are of medium fastness to light; however, such fabrics exhibit poor wash fastness. Likewise, fabrics dyed with reactive dyes and treated with polyalkylated polymethylol melamine resins exhibit poor fastness to light, but have good wash fastness.

The polymethylol melamines and the alkylated derivatives thereof are capable of polymerizing with themselves, i.e., homopolymerizing, and also readily react with cotton or other cellulosic materials to cross-link same. On the other hand, N,N'-dimethylol-4,5-dihydroxyethylene urea does not homopolymerize, although it does readily react with cellulosic materials to creaseproof the same. As a consequence, the polymethylated melamines and their alkylated derivatives are able to serve the functions of creaseproofing cellulosic materials and building the hand of fabrics containing synthetic fibers or blends thereof with cotton or other cellulosic materials.

A serious drawback of most known hand builders heretofore employed in combination with N,N'-dimethylol-4,5-dihydroxyethylene urea on fabric blends of synthetic and cellulosic fibers is the problem of "mark off" wherein the finished fabric can be easily marked by rubbing or pressure stroking the surface thereof with a hard object, such as the finger nail, to leave a substantially indelible mark on said surface. Another defect of such prior hand builders is their low resistance and impermanence to home laundering. A further defect of most known hand builders heretofore used in combination with N,N'-dimethylol-4,5-dihydroxyethylene urea is their instability to long periods of storage in uncured condition, such as encountered in the field of permanent crease wherein fabric blends are treated with creaseproofing chemicals, e.g., N,N'-dimethylol-4,5-dihydroxyethylene urea, then dried and stored for extended periods prior to making up into garments, pressing and curing. In most cases, these known hand builders heretofore employed are sensitive to heat, resulting in changes in hand during hard pressing and/or curing of garments made from fabrics containing same and making it substantially impossible to predict and control the final hand to be expected in the finished garment.

Therefore, it is an object of the present invention to provide a novel composition which, when applied to textile fabrics will yield a finish having the desirable characteristics of the respective components without the undesirable characteristics which are generally inherent in these components.

It is an object to provide novel textile finishing compositions which, when applied to cellulose containing textile fabrics, are characterized by a high resistance to the degradative effects of chlorine retention both with respect to yellowing due to bleaching and with respect to reduced tensile strength of chlorine bleached goods after repeated launderings.

Another object is to provide a novel composition which, when applied to textile materials, produces an unexpected or synergistic effect in the minimizing of the degradative effects resulting from chlorine retention.

It is a further object to provide novel compositions which, when applied to dyed textile fabrics, will not impair their fastness to light.

A still further object is to provide compositions which minimize reductions in light fastness of fiber reactive dyes due to resin finishing.

A still further object is to provide novel compositions which, when applied to textile fabrics dyed with direct colors, exerts a dye-fixative effect on such direct colors.

Another object is the provision of creaseproofing compositions which exert a dye-fixative effect on fabrics dyed with direct colors and minimizes reductions in light fastness of fabrics dyed with fiber reactive dyes.

Another object is the provision of novel compositions which are capable of providing crease resistance and improved hand to fabrics of cellulosic materials, e.g., cotton, or blends thereof with synthetic fibers, e.g., polyester fibers.

Another object is the provision of novel creaseproofing and hand-building compositions which are not afflicted with "mark off."

Another object is the provision of novel creaseproofing and hand-building compositions which, when applied to and cured on fabrics, are durable and resistant to being washed out in the usual home laundering.

Another object is the provision of novel creaseproofing and hand-building compositions which, when applied to fabrics, provide a substantially constant hand thereto with little or no changes on subsequent application of heat in pressing, drying, partial curing, full curing or recuring.

Another object is the provision of novel compositions characterized by enhancing the effectiveness of water- and stain-repellents applied to fabrics as a part of said compositions or otherwise.

These and other objects and advantages of the present invention will become more apparent from the detailed description thereof set froth hereinbelow.

In accordance with the present invention, a novel water-soluble composition of matter is provided which comprises a mixture of N,N'-dimethylol-4,5-dihydroxyethylene urea and polymethylol melamine resin and alkylated derivatives thereof in relative ratios of from 0.5 to 10 mols of the N,N'-dimethylol-4,5-dihydroxyethylene urea per mol of the melamine resin.

Further, in accordance with the present invention, a composition is provided for finishing cellulose containing textile materials whereby a wrinkle resistant finish resistant to the degradative effects of retained chlorine is obtained.

It was unexpectedly found that novel compositions within this invention exert a dye-fixative effect on fabrics dyed with direct dyes and minimize reductions in light fastness of fabrics dyed with fiber reactive dyes. Also, compositions within this invention are capable of providing crease resistance and improved hand to all cotton fabrics or cotton/synthetic blend fabrics, etc., without "mark off," or odor problems, and the improved hand is durable to laundering. Compositions within this invention can be applied with catalysts to cellulosic fabrics which are dried, either partially or fully, and stored for long periods, six months or more, without losing their ability to be formed into shape-retentive, crease-resistant garments having improved durable hand and no "mark off." Compositions within this invention are stable to long periods of storage in the presence of catalysts, applied to and heat-dried on fabrics, without resulting in changes in hand of fabrics, to which they are applied, caused by heat or time.

By the terms "cellulose containing textile materials" or "cellulosic materials," as those terms are employed herein, is meant fibers, yarns, filaments, formed fabrics, whether knitted, woven or nonwoven, felted or otherwise formed, containing at least 25 per cent of cellulosic fiber, as for example, cotton, viscose rayon, linen, flax, jute, ramie, or other cellulosic material. These cellulosic textile materials may be employed in combination with other known textile materials; for example, they may be blended with other natural or synthetic fibers, such as silk, wool, nylon, acrylic and polyester fibers and the like. Polyester fibers marketed under the proprietory names of Fortrel, Kodel, Vycron, Dacron and the like can be employed.

The N,N'-dimethylol-4,5-dihydroxyethylene urea is disclosed in U.S. Pat. No. 2,764,573 and its use as a creaseproofing agent is shown in U.S. Pat. No. 2,731,364. Methods for making this material can be found in the above-mentioned patents. In addition, the condensation products of urea, glyoxal and formaldehyde disclosed in U.S. Pat. No. 3,049,446 are useful herein as the N,N'-dimethylol-4,5-dihydroxyethylene urea compound.

The polymethylol melamine resins of this invention are the condensation products of melamine and formaldehyde and lower alkanol (i.e., alkylated) derivatives thereof. Such resins contain any suitable number of methylol groups (i.e., combined formaldehyde), for example, 3 to 6 methylol groups. These polymethylol melamine resins can be etherified or alkylated up to the degree of methylolation to form the alkylated derivatives which are useful in this invention. The numerous alkylated polymethylol melamines contemplated by this invention include those characterized as being partially or substantially fully etherified, with the substantially fully methylated melamine resins being preferred. Preferred melamine resins are trimethoxy tetramethylol melamine, i.e., a methylated melamine-formaldehyde condensate containing an average of three methoxymethyl groups and one methylol group bonded to nitrogen; a methylated melamine-formaldehyde condensate having an average of 2 methoxymethyl groups and one methylol group; and one having an average of 4.5 methoxymethyl groups and 0.5 methylol group.

In general, the mode of treating fabrics with the compositions of this invention is the same as that for either of the components alone, namely, by the use of conventional steps, i.e., impregnating fabrics with the composition mixed with an acidic catalyst, in water solution, drying the fabric, and curing the composition on the fabric. The composition, preferably in aqueous solution, may be applied to the cellulosic textile, such as cotton fabric or cotton-synthetic blends, by any of the well-known techniques, as, for example, spraying, dipping, immersing, padding and the like, in such amounts as to impregnate the fabric with between 2 and about 30 percent, for example, and, in some instances, higher amounts, of the water-free composition, based on the dry weight of the fabric. Thus, in treating fabric consisting of cotton fibers or cotton-synthetic blends, the concentration of from about 2 to about 30 percent and more preferably between 3.5 and 10 percent of composition solids, based on the dry weight of the fabric, are utilized.

Acidic curing catalysts are preferred. Such acidic catalysts include the free acids, such as hydrochloric acid, sulfuric acid, phosphoric acid, maleic acid and the like, the acid salts, such as ammonium chloride, zinc nitrate, magnesium chloride, ammonium phosphates, sodium phosphates and the like, and the amine salts, such as monoethanolamine hydrochloride and the like.

The compositions of this invention and catalyst are preferably applied to the fabric as aqueous solutions to provide wet pickups of 50 to 100 percent, preferably 70 percent, based on the weight of fabric. The concentration of the composition in the impregnating solution preferably ranges from 2 to 25 weight percent and that of the catalyst preferably ranges from 0.1 to 10 weight percent. The aqueous solution of the composition and catalyst is conveniently padded onto the fabric, preferably followed by drying and then partial curing under conditions most advantageous to the composition and catalyst system employed.

It will be obvious that the impregnating solution can contain other materials for providing special effects; for example, softeners such as silicones, polyethylene dispersions, cationic surface active agents and the like for adjusting the hand of the fabric to be treated, improve its tear strength and/or sewability; water-soluble polymeric bodiers such as polyvinyl alcohol, modified starch or precondensed thermosetting resins for imparting body to the fabric; soft thermoplastic resins such as acrylic resins, etc., for improving the abrasion resistance and tear strength or for modifying the hand of the fabric; oil and water repellents such as silicones, fluorocarbon chemicals and the like to impart resistance to oil- and water-borne stains; and other additives for providing desired special effects.

While the general mode of fabric treatment with the compositions of this invention involves no wide departure from standard practice in making fabrics wrinkle resistant with prior art resins, and while one highly advantageous feature of the composition of this invention is its insensitivity to varied treating conditions; nevertheless, it is important that the curing step be carried out under conditions sufficient to fix substantially all of the nitrogen-containing compounds on the fabric. This thorough fixation can be achieved by a hard cure which may be obtained by a balanced combination of all of the following factors:

1. Raising the curing temperature.
2. Increasing the curing time.
3. Increasing the amount of acidic catalyst.
4. Decreasing the amount of alkali in the fabric.

All the fabrics employed in examples I through VII herein were soured and contained only about 0.05 percent alkali expressed as sodium hydroxide; however, it is sometimes a standard practice to employ fabrics containing a larger amount of alkali, such as about 0.15 percent to 0.4 percent. By having the proper alkalinity in the fabric and employing a proper amount of catalyst in relation thereto, a satisfactory curing time and temperature can be very readily determined by treating a fabric sample, determining loss of strength of the treated fabric by the AATCC Test 92-1962 for damage from retained chlorine and, if necessary, adjusting the curing time and temperature until the treated fabric loses substantially no more strength that the same fabric without treatment when put through the above-mentioned test.

It will be seen that a hard cure can only be obtained under conditions of catalysis in which there is an amount of acidic catalyst sufficient to neutralize all the alkali in the fabric, plus an amount of catalyst sufficient to accelerate curing of the composition, the latter being equivalent to about 1 to 2 percent measured as catalyst in the treating bath.

The cellulosic fabric can be neutralized by souring, or otherwise, impregnated with from about 50 to 100 percent of its weight of a 2 percent to 30 percent aqueous solution of a mixture of N,N'-dimethylol-4,5-dihydroxyethylene urea and a polymethylol melamine or alkylated derivative thereof in the presence of catalyst, dried to a moisture content of about 10 percent or below and cured for about 1 to 10 minutes at a temperature of about 250° F. to about 450° F. and more preferably at a temperature from about 300° F. to about 350° F.

The polymethylol melamines or alkylated derivatives can be mixed with the N,N'-dimethylol-4,5-dihydroxyethylene urea in water solution either just prior to the application of the resinous material to the fabric, or they may be mixed together and stored for a period of time prior to their application to the fabric. Generally, the composition which is applied to the fabric contains an acidic catalyst which functions to neutralize the alkali in the fabric and also as a curing agent or accelerator. The concentration of catalyst employed may range, for example, from about 0.5 to about 25 percent or higher based on the weight of the composition solids and depending upon the particular catalyst employed. Thus, for example, from between about 0.5 and about 10 percent of a free acid such as phosphoric, tartaric, oxalic and the like may be employed. With respect to metal salts such as magnesium chloride, zinc chloride, zinc nitrate and aluminum chloride, amounts of about 1 to 25 percent based on composition solids have been successfully employed. Although the invention is not limited to any particular catalyst, it has been found that a metal salt such as zinc nitrate produces fabrics having better wrinkle resistance properties in relation to strength loss than other catalysts and improved fastness to light of direct dyed, resintreated fabrics.

Following the application of the novel composition and catalyst to the textile fabric, the material is subjected to drying and curing operations to effect the properties of wrinkle resistance. The drying and curing operation may be carried out in a single step or in separate steps. The temperatures at which the drying and curing operations are effective vary widely and are influenced to some extent by the type of catalyst employed. Normally, the temperature range extends from about 250° F. to about 450° F. or even higher. Generally speaking, the time of the drying and/or curing operation is inversely proportional to the temperature employed and, of course, is influenced by whether or not separate or combined drying and curing steps are employed.

When the drying and curing operation is carried out in a single step, a time of from about 1 minute to about 10 minutes may be employed at temperatures from about 450° F. to 250° F., respectively. When the fabric has been dried preliminary to curing, curing times of 10 minutes to about 1 minute at temperatures of from between 250° and 450° F., respectively, have been employed. As used herein, "dry" curing is intended to mean curing under substantially dry conditions as distinguished from wet curing.

The compositions of this invention, especially those containing about 3.0 to about 10.0 mols of N,N'-dimethylol-4,5-dihydroxyethylene urea per mol of melamine resin, are eminently suited for use in making sensitized fabrics for the manufacture of crease-resistant, shape-retentive garments by procedures such as that disclosed in a copending application filed concurrently herewith. These procedures comprise impregnating the fabric with said compositions, drying and partially curing the impregnated fabric in the substantial absence of water originally present in the treating solution or composition and the fabric as natural moisture content to result in a sensitized fabric which can be stored and shipped to garment manufacturers. Thereafter, the fabrics are cut, sewn and otherwise formed into garments which are pressed to shape same and then heated to recure the partially cured composition in the fabric.

In the drying and partial curing steps, substantially all of the water originally present in the aqueous impregnating solution, and in the fabric as the natural moisture content thereof, must be removed. This water must be removed to the extent that not more than 0.5 weight percent based on the dry weight of the fabric, remains. When this is done, it was unexpectedly discovered that the curing can be controlled and stopped at any desired point short of an otherwise complete cure. The specific conditions of the drying and partial curing steps depend upon the particular creaseproofing material being employed. These conditions should be adequate to provide 20 to 75 percent of the total gain in crease resistance obtained when a substantially complete cure is affected as compared to the dried, impregnated fabric (e.g., dried to 5 weight percent moisture). For example, if the crease resistance of a given dried, impregnated fabric (as measured by the Monsanto Crease Recovery Test, AATCC Tentative Test Method 66-1959T) is 189 and the crease resistance of the same fabric in substantially fully cured condition is 307, the crease resistance of the fabric after partial curing should be in the range of 212.6 to 277.5.

Time and temperature conditions for effecting the drying and partial curing of the impregnated fabric can be varied over a considerable range. For example, drying temperatures of 75° to 300° F. and drying times adequate to reduce the moisture content to a suitable range, e.g., 5 weight percent, wherein the desired partial curing can be effected efficiently are suitable. Representative drying times include 15 seconds at the higher drying temperatures up to one hour at the lower drying temperatures. Partial curing temperatures can range from about 200° F. to about 340° F. with temperatures of about 240° F. to about 260° F. being preferred. The time for effecting partial curing will depend on the temperature employed and should be sufficient to effect the desired degree of partial cure within the parameters given hereinabove. Representative partial curing times range from 1 to 5 minutes. Drying and partial curing can be effected without interruption at the same or different temperatures, if desired.

The dried, partially cured fabric is then wound onto tubes for shipment to the garment manufacturer. The sensitized fabric treated in accordance with this invention is stable for long periods of storage under a wide range of storage conditions.

The garment manufacturer then cuts the sensitized fabric according to the patterns for the desired garment and then sews and otherwise finishes the cut fabric into a garment. The garment is then pressed in accordance with conventional procedures or any other suitable procedures. For example, the pressing temperature can be 300° F., or above or below, and the pressing pressure can range from light to heavy. The pressing cycle, for example, can include steaming with live steam for 4 seconds, pressing with heavy pressure for 7 seconds, followed by vacuum for 4 seconds. Other times and temperatures for the pressing operation can be employed and the above-mentioned cycle can be considerably changed, as desired, to provide special effects or permit the use of a variety of types of presses or pressing cycles.

After pressing, the garment is recured. This can be done in a curing oven specially provided therefor or any other suitable means can be employed. The recuring step is preferably carried out at a temperature higher than the above-mentioned partial curing step. Suitable ranges for the recuring operation are from 250° to 375° F. and preferably from 300° to 350° F. The time of recuring should be sufficient to substantially complete the curing of the sensitized fabric. Such complete curing can be obtained, for example, over a period of 2 to 20 minutes; the lower the temperature, the longer the time necessary for recuring. After recuring has been completed, the garment is permitted to adjust its temperature to room temperature and then is stored, packed and/or shipped to garment retailers.

Typical fabrics which can be presensitized in the manner taught herein include the cellulosic textile fabrics, such as 100 percent cotton, and blends of cotton with the well-known synthetic fibers, including polyester fibers, such as Fortrel (registered trademark of Fiber Industries, Inc.), which is a polyester comprising a polymerized polycondensate of terephthalic anhydride and ethylene glycol; nylon, polymers containing at least 80 percent polymerized acrylonitrile, such as those available commercially under the trade names Orlon and Acrilan, and so on. Staple synthetic fibers, or continuous synthetic filaments, as desired, can be employed in the ways that are well known in the art.

U.S. Pat. No. 2,974,432 discloses and claims a method for producing crease-resistant, durably creased garments by impregnating a cellulosic fabric with a creaseproofing resin; partially drying the impregnated fabric at a temperature below the curing temperature of the resin to a moisture content of 2 to 8 percent, cutting, sewing and forming a garment from the partially dried impregnated fabric; pressing the garment to provide a crease and flat, crease-free areas thereto; and then curing the pressed garment to make the crease durable and the flat areas crease resistant. The compositions of this invention, especially in the above-mentioned mol ratios of 3.0 to 10.0, are well suited for use in place of the polymerizable resin in the patented process.

The following examples are presented. In these examples, unless otherwise specified, all parts and percentages are by weight and all temperatures are in degrees Fahrenheit. The crease resistance values were determined by the Monsanto Crease Recovery Test (AATCC Tentative Test Method 66-1959T). The appearance ratings were determined by AATCC Tentative Test Method 88-1960. The tear strength determinations were made by the Trapezoid method and tensile strength determinations were made by the Grab method. The crease retention values were obtained in accordance with AATCC Tentative Test 88-C-1962T; the spray ratings were obtained according to AATCC Standard Test 22-1961, and the oil ratings were obtained according to Minnesota Mining & Manufacturing, Inc., technical data sheet titled "Textile Chemicals," published Jan. 2, 1962, Appendix B-Test Method Minnesota Mining & Manufacturing oil repellency test.

EXAMPLE I

A mixture of 356 parts (1 mol) of dimethylol dihydroxyethylene urea (50 percent solids solution) and 346 parts (0.6 mols) of trimethoxy tetramethylol melamine (50 percent solids solution) was made. The mixture was a water-soluble, substantially colorless liquid stable at room temperature for a long period of time.

EXAMPLE II

The mixture of Example I comprising dimethylol dihydroxyethylene urea and trimethoxy tetramethylol melamine was diluted with sufficient water to give a 5 percent solids concentration. About 1.25 percent by weight of zinc nitrate hexahydrate was added as catalyst. A sample of cotton fabric containing about 0.05 percent alkali was passed through the padding solution to give a wet pickup of about 80 percent of its weight. The impregnated fabric was dried at a temperature of 275° F. for approximately 60 seconds and then cured at a temperature of 300° F. for approximately 70 seconds. The cured fabric was then washed to remove the residual resin and/or catalyst, dried and tested. The finished fabric possesses a crease-recovery angle of 243; after five hot alkaline washes done in accordance with Federal Specification Test CCC-T-1 91B Method 5550.1, the fabric possesses a crease-recovery angle of 230 and after five commercial washes in which a hypochlorite bleach and a zinc silicofluoride sour are employed, it possesses a crease-recovery angle of 224.

EXAMPLE III

The solution of example I was diluted with sufficient water to give a 5 percent solids concentration. About 1.25 percent of zinc nitrate hexahydrate was added to the solution as a catalyst. The solution was padded onto a sample of cotton fabric to give a wet pickup of about 80 percent of its weight. The impregnated fabric was dried at a temperature of 275° F. for approximately 60 seconds and then cured at a temperature of 340° F. for approximately 70 seconds. The cured fabric was then washed, dried and tested. The finished fabric possesses a crease-recovery angle of 262; after five hot alkaline washes done in accordance with Federal Specification Test CCC-T-1 91B Method 5550.1, it possesses a crease-recovery angle of 242 and after five commercial washes it possesses a crease-recovery angle of 243.

EXAMPLE IV

A solution consisting of a 5 percent solution of dimethylol dihydroxyethylene urea and 1.25 percent of a zinc nitrate hexahydrate catalyst based on the weight of the solution was padded onto a bleached, mercerized, and soured cotton fabric containing about 0.05 percent alkali. The cotton fabric was impregnated with about 80 percent of its weight of the padding solution. After impregnation, the fabric was dried at a temperature of 275° F. for 60 seconds. The dried fabric was then heated for approximately 70 seconds at 300° F. to cure the resin after which it was washed to remove any residual resin or catalyst. The fabric possesses a crease-recovery angle of 252; after five hot alkaline washes done in accordance with Federal Specification Test CCC-T-191B Method 5550.1, it possesses a crease-recovery angle of 243 and after five commercial washes it possesses a crease-recovery angle of 235.

EXAMPLE V

The cotton fabric of example IV was impregnated with a solution consisting of 5 percent of dimethylol dihydroxyethylene urea and 1.25 percent catalyst by weight, based on total weight of the solution. The fabric was then dried at a temperature of 275° F. for 60 seconds and then cured at 340° F. for 70 seconds. The treated fabric was then washed to remove the residual resin and catalyst, dried, and tested. The fabric possesses a crease-recovery angle of 263; after five hot alkaline washes done in accordance with Federal Specification Test CCC-T-191B Method 5550.1, it possesses a crease-recovery angle of 256, and after five commercial washes, it possesses a crease-recovery angle of 248.

EXAMPLE VI

Cotton fabric was impregnated with a water solution of 5 percent of trimethoxy tetramethylol melamine and 1.25 percent by weight of zinc nitrate hexahydrate catalyst. The fabric was dried at 275° F. for 60 seconds and cured at 300° F. for 70 seconds. The treated fabric was washed to remove the residual resin and catalyst, dried and tested. The fabric possesses a crease-recovery angle of 219; after five hot alkaline washes done in accordance with Federal Specification Test CCC-T-1 91B Method 5550.1, it possesses a crease-recovery angle of 211, and after five commercial washes, it possesses a crease-recovery angle of 205.

EXAMPLE VII

A cotton fabric was impregnated with 5 percent trimethoxy tetramethylol melamine and 1.25 percent of a zinc nitrate hexahydrate catalyst. The impregnated fabric was dried at a temperature of 275° F. for 60 seconds and then cured at 340° F. for 70 seconds. The treated fabric was then washed, dried and tested. This fabric possesses a crease-recovery angle of 248; after five hot alkaline washes done in accordance with Federal Specification Test CCC-T-191B Method 5550.1, it possesses a crease-recovery angle of 241, and after five commercial washes, it possesses a crease-recovery angle of 210.

While examples IV, V, VI and VII are illustrative of the prior art, they are included for purposes of comparison only, and are not to be construed as a specific embodiment of this invention.

Table I is a comparison of the physical properties of fabrics which have been treated with dimethylol dihydroxyethylene urea and trimethoxy tetramethylol melamine and mixtures thereof. In examples II and III, the fabrics were treated with a composition containing a mixture of dimethylol dihydroxyethylene urea and trimethoxy tetramethylol melamine. In examples IV and V, the fabrics were treated with dimethylol dihydroxyethylene urea and in examples VI and VII, the fabrics were treated with trimethoxy tetramethylol melamine.

resin possess each of the advantages of the melamine resin and dimethylol dihydroxyethylene urea without some of the disadvantages which would ordinarily be expected. In particular, the known advantage of the N,N'-dimethylol-4,5-dihydroxyethylene urea in minimizing lightfastness reduction of fiber reactive and direct dyes on finishing is retained despite the presence of the melamine resin. Likewise, the dye-fixative effect of the melamine resin on direct colors is retained, and even enhanced, despite the presence of the N,N'-dimethylol-4,5dihydroxyethylene urea. Furthermore, these compositions demonstrate a surprisingly synergistic effect in that the strength loss due to chlorine retention resulting from the use of the compositions in less than would be expected from a

TABLE I

|  | II | III | IV | V | VI | VII |
|---|---|---|---|---|---|---|
| Cure, ° F | 300 | 340 | 300 | 340 | 300 | 340 |
| Crease recovery (AATCC Test Method 66-1959T): |  |  |  |  |  |  |
| Original | 243 | 262 | 252 | 263 | 219 | 248 |
| 5 sanforized washes | 230 | 242 | 243 | 256 | 211 | 241 |
| 5 commercial washes | 224 | 243 | 235 | 248 | 205 | 210 |
| Filling tear (trapezoid): |  |  |  |  |  |  |
| Original | 2.5 | 2.2 | 2.3 | 1.7 | 2.9 | 2.5 |
| 5 sanforized washes | 2.8 | 2.3 | 2.3 | 1.8 | 3.1 | 2.4 |
| 5 commercial washes | 2.9 | 2.3 | 2.4 | 1.9 | 3.6 | 2.7 |
| Filling tensile (grab): |  |  |  |  |  |  |
| Original | 46.0 | 38.0 | 40.0 | 31.0 | 50.0 | 41.0 |
| 5 sanforized washes | 44.8 | 40.0 | 38.6 | 32.4 | 50.4 | 39.4 |
| 5 commercial washes | 47.0 | 41.0 | 44.0 | 34.0 | 56.0 | 45.0 |
| Chlorine damage, percent (AATCC test method 92-1962): |  |  |  |  |  |  |
| Original | 1 | 11 | 0 | 2 | 0 | 4 |
| 5 sanforized washes | 42 | 12 | 74 | 5 | 45 | 11 |
| 5 commercial washes | 78 | 61 | 82 | 58 | 80 | 38 |
| Reflectance, Hunter Model D-40 Reflectometer Blue filter: |  |  |  |  |  |  |
| Original | 87.4 | 86.9 | 88.3 | 85.3 | 89.1 | 86.7 |
| After hot chlorine treatment | 85.2 | 87.0 | 89.6 | 88.6 | 85.5 | 86.0 |
| After 5 commercial washes followed by hot chlorine treatment (2.6 g./l. available chlorine at 160° F. for 10 mins.) | 78.6 | 80.9 | 89.9 | 89.4 | 68.4 | 75.8 |

|  | Untreated control | III | V | VII |
|---|---|---|---|---|
| Light fastness, AATCC test method 16A-1969: |  |  |  |  |
| Red Fabric, dyed with chloramine Fast Scarlet 2 BSW and pyrazol Fast Orange LUF | 2 | 2 | 2 | 2 |
| Blue Fabric, dyed with A.R.F. Blue BLF and Fastusol Turquoise Blue LGA | 5 | 5 | 5 | 4 |
| Brown fabric, dyed with Lumicrease Orange 3LG, pyrazol Fast Rubine BLN, and Lumicrease Gray 3 LBN | 5 | 5 | 5 | 5 |
| Green Fabric, dyed with pyrazol Turquoise GLL and Lumicrease Yellow 3 LG | 2 | 3 | 3 | 2 |
| Dye-Fixative Effect, AATCC test method 36-1961, Number 1 Wash Test: |  |  |  |  |
| Red fabric, as above | 1-2 | 2-3 | 2 | 2-3 |
| Blue fabric, as above | 2 | 4 | 3-4 | 4 |
| Brown fabric, as above | 2 | 3-4 | 3 | 4 |
| Green fabric, as above | 3 | 4 | 3-4 | 4 |

Fastusol Turquoise Blue LGA has the structural formula:

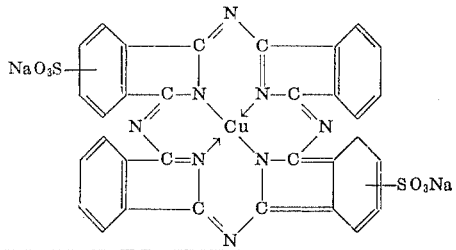

Color Index, Second Edition, 1956, Supplement 1963, page S869 shows Fastusol Turquoise Blue LGA corresponds to C.I. Direct Blue 86 which has color Index number 74180. C.I. Direct Blue, Color Index number 74180 has the above structural formula as shown in Color Index, Second Edition, Vol. 3, 1956, copyrighted 1957, page 3570.

The textile fabrics treated with compositions comprising about 2 to 1 mols of N,N'-dimethylol-4,5-dihydroxyethylene urea and about 1 to 2 mols methylated methylol melamine mixture of the individual components thereof. Likewise, it will be seen that yellowing with hot hypochlorite and strength loss from chlorine retention can be avoided in the production of wrinkle resistant cotton fabrics by using a mixture of an etherified polymethylol melamine and N,N'-dimethylol-4,5-dihydroxyethylene urea and curing the fabric under conditions which will assure that substantially all the resin is fixed thereon.

Surprisingly, it has been found that fabrics treated with the novel compositions of this invention have a tear and tensile strength approximately equivalent to alkylated polymethylol melamine employed therein but substantially higher than the N,N'-dimethylol-4,5-dihydroxyethylene urea at the same level of crease recovery. The wash fastness of fabrics treated with the novel compositions was shown to be intermediate between the alkylated polymethylol melamine and the N,N'-dimethylol-4,5-dihydroxyethylene urea; however, a fabric dyed with direct dyestuffs and treated according to this invention exhibited significantly better bleeding characteristics than unfinished goods.

EXAMPLE VIII

An aqueous solution containing 18 percent of a 50 percent solids aqueous solution of 1,3-dimethylol-4,5-dihydroxyethylene urea; 5 percent of a 40 percent solids aqueous solution of a polymethylated polymethylol melamine having an average of about three methoxymethyl groups and about one methylol group bonded to nitrogen; 3 per cent of a 64 per cent solids aqueous solution of magnesium chloride hexahydrate; 2 percent of a 50 percent solids aqueous solution of polyvinyl acetate; 3 percent of a 25 percent solids aqueous emulsion of polyethylene; 1.5 percent of a 25 percent solids aqueous emulsion of Ceranine HC (a cationic softener for fluorochemicals marketed by Sandoz Chemical Works, Inc.); and 2 percent of Scotchgard FC–208 (an aqueous latex of a perfluoroalkyl acrylate polymer under U.S. Pat. No. 2,803,615) made and sold by Minnesota Mining and Manufacturing Co. was prepared and identified as Solution 1. Solution 1 contained about 7.0 to about 7.5 mols of N,N'-dimethylol-4,5-dihydroxyethylene urea per mol of said polymethylated polymethylol melamine. Solution 2 was made up in the same manner as Solution 1 except that the aqueous solution of polymethylated polymethylol melamine was omitted. Each solution was padded onto a 100 percent cotton fabric to about a 65 percent wet pickup. Thereafter, the impregnated fabric was squeezed to remove excess solution, dried at 250° F. to a moisture content of about 5 percent (less than approximately 45 seconds drying time) and then partially cured for 2 minutes at 250° F. After partial curing, the fabric no longer contained any water originally present in the impregnating solution or originally present as the natural moisture content of the fabric.

The thus treated fabric was cut in accordance with regular patterns and, thereafter, sewn into a pair of trousers. Buttons and other findings were applied. The trousers were then pressed at 300° F. for 10 seconds to impart creases thereto and to iron out the flat areas thereof. The garments were then recured in an oven for 4 minutes at 340° F. The garments produced from fabric treated with Solution 1 had a crease retention rating of 4, a spray rating of 90 and an oil rating of 100 and the garments made from fabric treated with Solution 2 had a crease retention rating of 4, a spray rating of 80 and an oil rating of 100.

The hand of the garment fabrics treated with Solution 1 was soft and supple, but not limp, and was substantially the same as before the garments were made. The hand remained unchanged even after numerous washings and the garment fabric showed no "mark off." Similar results are obtained using a 50/50 Fortrel/cotton fabric.

EXAMPLE IX

An aqueous solution containing 18 percent of an aqueous solution containing 3 parts by weight of a 50 percent solids aqueous solution of 1,3-dimethylol-4,5-dihydroxyethylene urea and 2 parts by weight of a 40 percent solids aqueous solution of a polymethylated polymethylol melamine having an average of about four and one-half methoxymethyl groups and about one-half methylol group bonded to nitrogen; 3.5 percent of a 31.5 percent solids aqueous solution of zinc nitrate; 3 percent of a 25 percent solids aqueous emulsion of polyethylene and 0.2 percent of Triton X–100 was prepared and is identified as Solution 1. A second solution identified as Solution 2 was prepared identical to Solution 1 except that a 64 percent solids aqueous solution of magnesium chloride hexahydrate was employed in place of the zinc nitrate solution. The solutions each contained about 3.0 to about 3.6 mols of N,N'-dimethylol-4,5-dihydroxyethylene urea per mol of the polymethylated polymethylol melamine. The solutions were each padded onto 100 percent cotton fabric to a wet pickup of 60 to 70 percent and then dried at about 250° F. to a 5 percent moisture content. The fabrics treated and dried at this point had a crease resistance of 189 for both solutions. Thereafter, the impregnated fabric was partially cured for 90 seconds at 250° F. to produce a fabric having a crease resistance of 265 for the fabric treated with Solution 1 and 216 for the fabric treated with Solution 2. After partial curing, the fabrics no longer contained any water originally present in the fabrics in the impregnating solutions or originally present as the natural moisture content of the fabrics.

The thus treated fabrics were then pressed for 10 seconds at about 300° F. to impart a crease thereto. Thereafter, the pressed fabrics were recured for 4 minutes at 340° F. to provide fabrics having a crease retention rating of 5, in both instances, and a crease resistance of 307 for the fabric treated with Solution 1 and 301 for the fabric treated with Solution 2.

The hand of the resulting garments was soft and supple, but not limp, and was substantially the same as that of the fabric from which they were made. The hand remained unchanged even after numerous washings and the garment fabric showed no "mark off." Similar results are obtained when using a 50/50 Fortrel/cotton blend.

EXAMPLE X

One hundred and sixty gallons of an aqueous solution was prepared containing 240 parts of a 50 percent solids aqueous solution of 1,3-dimethylol-4,5-dihydroxyethylene urea; 33 parts of an 80 percent solids aqueous solution of a polymethylated polymethylol melamine having an average of four and one-half methoxymethyl groups and one-half methylol group per molecule; 45 parts of 30 percent solids aqueous solution of polyvinyl acetate; 25 parts of a 25 percent solids aqueous emulsion of polyethylene; 25 parts of an acetic acid salt of a condensate of stearic acid and aminoethyl ethanolamine; 40 parts of a 64 percent solids aqueous solution of magnesium chloride hexahydrate and 1.5 parts of Triton X–100. The solution contained about 9.5 to 10 mols of N,N'-dimethylol-4,5-dihydroxyethylene urea per mol of said polymethylated polymethylol melamine. A 50/50 Fortrel/cotton twill of 1.64 yards per pound was padded through the resulting solution to provide an approximate 55 percent wet pickup. The impregnated fabric was dried on a 90 foot tenter chain at the rate of 75 yards a minute and a temperature of about 250° F. for the first 30 feet, about 275° F. for the second 30 feet and about 275° F. for the third 30 feet. Thereafter, the dried fabric was cured for 2 minutes at about 250° F., whereafter the fabric no longer contained any water originally present in the impregnating solution or originally present as natural moisture content of the fabric.

The fabric thus treated was rolled on tubes without any moire effect or any other difficulty and stored, then shipped to the garment manufacturer where it was again stored until needed. The fabric was capable of being stored for 6 months and more without detracting from its ability to be durably creased and/or shaped. Spots formed on the fabric after partial curing but before recuring, as hereinafter described, were able to be removed by spot cleaning without producing unsightly puckering or other defects. Thereafter, the fabric was cut and sewn with waistbands, pockets, etc., into trousers having cuffs. Creases were formed in the trousers and the trousers were otherwise shaped and pressed, on a press using a 5,000 pound head pressure, a 300° F. pressing temperature, and a 10 second pressing time. Thereafter, the pressed trousers were recured in an oven for 4 minutes at 340° F. to provide durability to the creases, shape and press of said trousers.

On recuring, the fabric shrunk less than one percent. As a result, the garment manufacturer was able to use his regular patterns in making the above-mentioned trousers.

The fabric was originally dyed with a sublimable dye which under prior art methods sublimed to a great extent. In this example, however, sublimation was greatly minimized and no shade change; no objectionable discoloration of waistbands, pocketing, etc.; and no undue deposition of sublimed dye on hangers or oven surfaces were detected. In addition, the garment manufacturer met with no difficulty in selecting and matching the facing threads used. Little or no objectionable odor was experienced during recuring and the fabric of the resulting trousers had a desirably soft hand but yet possessed the desired body and drape characteristics. The tensile strength and abrasion resistance of the trouser fabric were completely acceptable and were superior to those of garment fabrics treated by prior art methods.

The hand of the resulting garments was soft and supple, but not limp, and was substantially the same as that of the fabric from which they were made. The hand remained unchanged even after numerous washings and the garment fabric showed no "mark off."

EXAMPLE XI

An aqueous solution identical to that described in example X was prepared, except that the 33 parts of the 80 percent solids aqueous solution of polymethylated polymethylol melamine employed therein was substituted with 66 parts of a 40 percent solids aqueous solution of a polymethylated polymethylol melamine having an average of about three methoxymethyl groups and about one methylol group bonded to nitrogen. The resulting solution contained between 5.5 and 6 mols of N,N'-dimethylol-4,5-dihydroxyethylene urea per mol of polymethylated polymethylol melamine and, when applied to fabric in the manner described in example X, resulted in a sensitized fabric having substantially the same properties as that described in example X. The resulting fabric was formed into a garment and treated as described in example X to provide a garment having substantially the same properties as those of the garments of example X.

EXAMPLE XII

An aqueous solution identical to that described in example X was prepared, except that the 33 parts of the 80 percent solids aqueous solution of polymethylated polymethylol melamine employed therein was substituted with 66 parts of a 40 percent solids aqueous solution of a polymethylated polymethylol melamine having an average of about four and one-half methoxymethyl groups and about one-half methylol group bonded to nitrogen. The resulting solution contained between 8.25 and 8.75 mols of N,N'-dimethylol-4,5-dihydroxyethylene urea per mol of polymethylated polymethylol melamine and, when applied to fabric and treated in the manner described in example X, resulted in a sensitized fabric having substantially the same properties as that described in example X. The resulting fabric was formed into a garment and treated as described in example X to provide garments having substantially the same properties as those of the garments of example X.

EXAMPLE XIII

An aqueous solution containing 18 percent of an aqueous solution containing three parts by weight of a 50 percent solids aqueous solution of 1,3-dimethylol-4,5-dihydroxyethylene urea and 2 parts by weight of a 40 percent solids aqueous solution of a polymethylated polymethylol melamine having an average of about four and one-half methoxymethyl groups and about one-half methylol group bonded to nitrogen; 3.5 percent of a 31.5 percent solids aqueous solution of zinc nitrate; 3 percent of a 25 percent solids aqueous emulsion of polyethylene and 0.2 percent of Triton X-100 was prepared and is identified as Solution 1. A second solution identified as Solution 2 was prepared identical to Solution 1 except that a 64 percent solids aqueous solution of magnesium chloride hexahydrate was employed in place of the zinc nitrate solution. The solutions were each padded onto 100 percent cotton fabric to a wet pickup of 60 to 70 percent and then dried at about 250° F. to a 5 percent moisture content. The fabrics treated and dried at this point had a crease resistance of 189 for both solutions.

The thus treated fabrics were then pressed for 10 seconds at about 300° F. to impart a crease thereto. Thereafter, the pressed fabrics were cured for 14 minutes at 325° F. to provide fabrics having a crease retention rating of 5, in both instances, and a crease resistance of 303 for the fabric treated with Solution 1 and 299 for the fabric treated with Solution 2.

The hand of the resulting garments was soft and supple, but not limp, and was substantially the same as that of the fabric from which they were made. The hand remained unchanged even after numerous washings and the garment fabric showed no "mark off." Similar results are obtained on a 50/50 cotton/Fortrel fabric.

While there is disclosed above but a limited number of embodiments for the invention herein presented, it is possible to produce still other embodiments without departing from the inventive concepts herein disclosed and the foregoing description is intended for purposes of illustration and not limitation.

I claim:

1. A cellulosic textile dyed with a direct dye characterized by a wrinkle-resistant finish which is resistant to degradative effects of retained chlorine, said finish comprising a cured composition which in the uncured state contained N,N'-dimethylol-4,5-dihydroxyethyleneurea and a methylated melamine-formaldehyde condensate in amounts of 0.5 to 10 moles of N,N'-dimethylol-4,5-dihydroxyethyleneurea per mole of said condensate, said condensate having an average of from 0.5 to 1 methylol groups and from 2 to 4.5 methoxymethyl groups bonded to nitrogen, said composition being cured with an acid catalyst and heat.

2. A cellulosic textile dyed with a direct dye characterized by a wrinkle-resistant finish which is resistant to degradative effects of retained chlorine, said finish comprising a cured composition which in the uncured state contained N,N'-dimethylol-4,5-dihydroxyethyleneurea and a methylated melamine-formaldehyde condensate having an average of 3 methoxymethyl groups and 1 methylol group bonded to nitrogen in amounts of 0.5 to 10 moles of N,N'-dimethylol-4,5-dihydroxyethyleneurea per mole of said condensate, said composition being cured with an acid catalyst and heat.

3. A cellulosic textile dyed with a direct dye characterized by a wrinkle-resistant finish which is resistant to degradative effects of retained chlorine, said finish comprising a cured composition which in the uncured state contained N,N'-dimethylol-4,5-dihydroxyethyleneurea and a methylated melamine-formaldehyde condensate having an average of 2 methoxymethyl groups and 1 methylol group bonded to nitrogen in amounts of about 9.5 to about 10 moles of N,N'-dimethylol-4,5-dihydroxyethyleneurea per mole of said condensate, said composition being cured with an acid catalyst and heat.

4. A cellulosic textile dyed with a direct dye characterized by a wrinkle-resistant finish which is resistant to degradative effects of retained chlorine, said finish comprising a cured composition which in the uncured state contained N,N'-dimethylol-4,5-dihydroxyethyleneurea and a methylated melamine-formaldehyde condensate having an average of 3 methoxymethyl groups and 1 methylol group bonded to nitrogen in amounts of about 7 to about 7.5 moles of N,N'-dimethylol-4,5-dihydroxyethyleneurea per mole of said condensate, said composition being cured with an acid catalyst and heat.

5. A cellulosic textile dyed with a direct dye characterized by a wrinkle-resistant finish which is resistant to degradative effects of retained chlorine, said finish comprising a cured composition which in the uncured state contained N,N'-dimethylol-4,5-dihydroxyethyleneurea and a methylated melamine-formaldehyde condensate having an average of 4.5 methoxymethyl groups and 0.5 methylol group bonded to nitrogen in amounts of about 8.25 to about 8.75 moles of N,N'-dimethylol-4,5-dihydroxyethyleneurea per mole of said condensate, said composition being cured with an acid catalyst and heat.

6. A cellulosic textile dyed with a direct dye characterized by a wrinkle-resistant finish which is resistant to degradative effects of retained chlorine, said finish comprising a cured composition which in the uncured state contained N,N'-dimethylol-4,5-dihydroxyethyleneurea and a methylated melamine-formaldehyde condensate having an average of 3 methoxymethyl groups and 1 methylol group bonded to nitrogen in amounts of about 3.0 to about 3.5 moles of N,N'-dimethylol-4,5-dihydroxyethyleneurea per mole of said condensate, said composition being cured with an acid catalyst and heat.

7. A cellulosic textile dyed with a direct dye characterized by a wrinkle-resistant finish which is resistant to degradative effects of retained chlorine, said finish comprising a cured composition which in the uncured state contained N,N'-dimethylol-4,5-dihydroxyethyleneurea and a methylated melamine-formaldehyde condensate in amounts of about 3.0 to about 10.0 moles of N,N'-dimethylol-4,5-dihydroxyethyleneurea per mole of said condensate, said condensate having an average of from 0.5 to 1 methylol groups and from 2 to 4.5 methoxymethyl groups bonded to nitrogen, said composition being cured with an acid catalyst and heat.

8. A process of finishing cellulosic textiles dyed with a direct dye whereby a wrinkle-resistant finish which is resistant to the degradative effects of retained chlorine is obtained comprising the steps of applying to said textile a composition comprising N,N'-dimethylol-4,5-dihydroxyethyleneurea, a methylated melamine-formaldehyde condensate in amounts of 0.5 to 10 mols DMDHEU per mol of said condensate, said condensate having an average of from 0.5 to 1 methylol groups and from 2 to 4.5 methoxymethyl groups bonded to nitrogen, and a sufficient amount of acidic catalyst to substantially neutralize any alkali in the fabric and catalyze said composition, drying, and thereafter dry curing the composition by heating.

9. The process as claimed in claim 8 wherein there is contained about 1 mole of N,N'-dimethylol-4,5-dihydroxyethyleneurea and about 0.6 mole of said condensate.

10. Process as claimed in claim 8 wherein said condensate contains 3 methoxymethyl groups and 1 methylol group bonded to nitrogen.

11. Process as claimed in claim 8 wherein there is contained 9.5 to 10 mols of N,N'-dimethylol-4,5-dihydroxyethyleneurea per mol of said condensate.

12. Process as claimed in claim 11 wherein said condensate contains an average of 4.5 methoxymethyl groups and 0.5 methylol group bonded to nitrogen.

* * * * *